Oct. 16, 1962 W. R. JOHNSON 3,059,049

SINGLE FRAME TESTER

Filed April 27, 1959 3 Sheets-Sheet 1

INVENTOR.
Wayne R. Johnson

By Smyth & Roston

Attorneys

Oct. 16, 1962 W. R. JOHNSON 3,059,049

SINGLE FRAME TESTER

Filed April 27, 1959 3 Sheets-Sheet 2

INVENTOR:
Wayne R. Johnson

By Smyth & Roston
Attorneys

INVENTOR:
Wayne R. Johnson
By Smyth & Roston
Attorneys 3,059,049
SINGLE FRAME TESTER Wayne R. Johnson, Los Angeles, Calif., assignor to Minnesota Mining and Manufacturing Company, St. Paul, Minn., a corporation of Delaware Filed Apr. 27, 1959, Ser. No. 809,187
19 Claims. (Cl. 178—6.6)

This invention relates to apparatus for reproducing television signals and the like and, more particularly, to editing equipment for magnetic tape.

Motion picture film is readily edited and conventional projectors and editing equipment include provision for halting the film at any frame so that a continuous image of the frame can be provided. It is often desirable and sometimes necessary to halt the film in this manner so that a single frame can be studied. In fact, considerable development effort has been devoted to permit single frame viewing without injuring the film.

When the recording medium is magnetic tape and the recorded signals are television signals and the like, direct single frame testing or viewing has heretofore been impossible. The difficulty arises because magnetically recorded signals are reproduced only when there is relative motion between the tape and the reproducing head. It is actually the rate of change of the recorded magnetization, not the magnetization itself, which is reproduced. If the tape is halted so that no relative motion exists between the tape and the head, signals are not reproduced.

In a specific illustrative embodiment of this invention, single frame testing and viewing of magnetically recorded television signals is accomplished utilizing a travelling wave transducer head disclosed and claimed in my co-pending patent application Serial No. 733,165, filed on May 5, 1958. As disclosed in the co-pending patent application, the travelling wave transducer head transversely records wideband signals, which may be television signals, on successive transverse tracks, of a longitudinally moving magnetic tape. By transversely recording information on the magnetic tape, the longitudinal movement of the tape may be materially reduced without reducing the reproducible band width or attenuating the higher frequencies of the wideband signals.

The transducer head, which may be stationary, is provided with a tubular shape disposed in a transverse direction across the tape. Transverse recording and reproducing is achieved even though the transducer head is stationary by exciting in the head longitudinal elastic waves which move transversely with respect to the longitudinal direction of the movement of the tape. The transducer head includes a tube which is magnetostrictive and the elastic waves momentarily relieve stresses normally in the tube so that, in effect, the elastic waves function as enabling waves by longitudinally changing the permeability of the tube. A signal coil is coupled to the tube for introducing frequency modulated signals to be recorded and for reproducing frequency modulated signals recorded on the magnetic tape.

In the specific illustrative embodiment of this invention, the transducer head is rotatable about its longitudinal axis whereas the tape is stationary. The relative motion between the surface of the transducer head and the tape is the same as the normal tape speed when the head is stationary and the tape is moved adjacent thereto. The circumference of the transducer head is equal to the longitudinal distance along the magnetic tape which is required for recording one complete television frame including two successive interlaced fields. Interlaced scanning is standard in the United States with each field including 262.5 horizontal lines which are vertically interlaced with the 262.5 lines of the succeeding and preceding fields. Two fields taken together represent a frame of 525 lines which has a repetition rate of 30 times per second.

Features of this invention relate to means for compensating for any misalignment between the rotating head and the transverse tracks on the stationary tape. Any misalignment or angular variation in the relative position between the magnetic tape and the transducer head which is referred to as skew, causes the excited elastic waves in the head to pass at an angle to the transverse tracks. When skew exists so that the elastic waves pass at an angle to the transverse tracks, cross-talk from adjacent channels occurs. To maintain the rotating head aligned with the transverse tracks on the tape, a braking motor is utilized having a control shaft coaxially mounted with the control shaft of the motor driving the transducer head. The transducer head is hollow and the control shaft also passes through the transducer head, engaging it at its distal end remote from the driving motor.

When the television signals are recorded on the magnetic tape, two control tracks along the longitudinal edges of the track are recorded therewith. The control signals are utilized to regulate the speed of the braking motor and, therefore, to control the alignment between the transducer head and the magnetic tape. Due to the fact that the transverse tracks are recorded at a slight angle, it is necessary to maintain the transducer head at a slight angle during the reproduction sequence in order to avoid cross-talk.

Other features of this invention pertain to utilizing the editing equipment for normal recording and reproducing sequences. During the normal sequences, the head is stationary and the magnetic tape is moved adjacent thereto.

Still other features of this invention relate to the provision of means for adjusting the repetition rate of the elastic pulses in the transducer head in order to synchronize them with the speed of the rotating head so that each elastic wave passes along the centerline of one of the transversely recorded tracks. The speed of the motor is also adjusted, utilizing the skew control signals recorded along the longitudinal edges of the tape.

Further advantages and features of this invention will become apparent upon consideration of the following description when read in conjunction with the drawing wherein.

Figure 5:
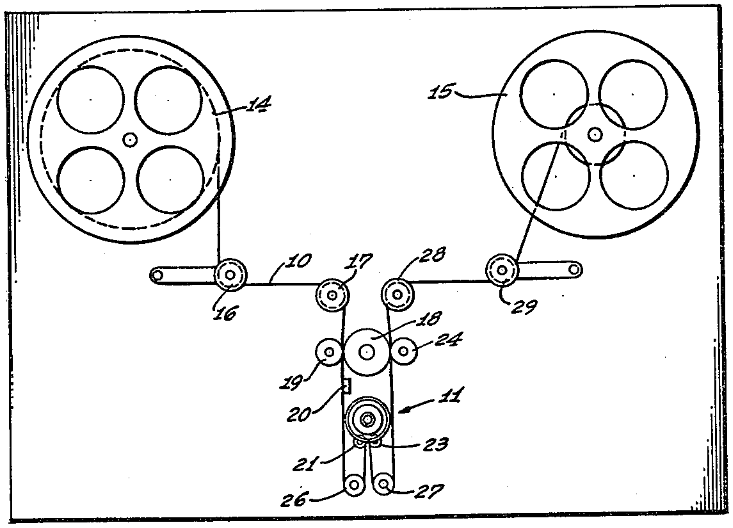
Figure 6:
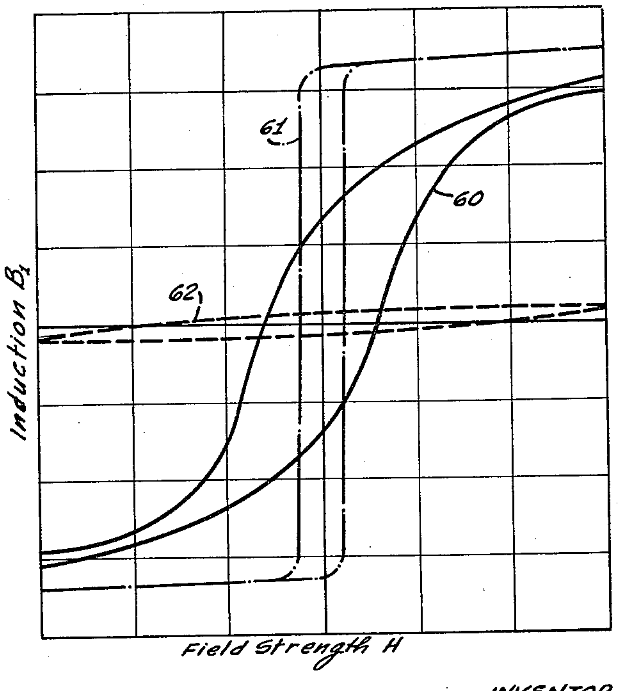

FIGURE 5 is a schematic diagrammatic representation of equipment for positioning and progressing the magnetic tape adjacent the rotatable travelling wave transducer head utilized in the transducing system of this invention; and FIGURE 6 is a series of curves illustrating the magnetic properties of the magnetostrictive tube material of the rotating transducer head utilized in the transducing system of this invention.

Figure 1:
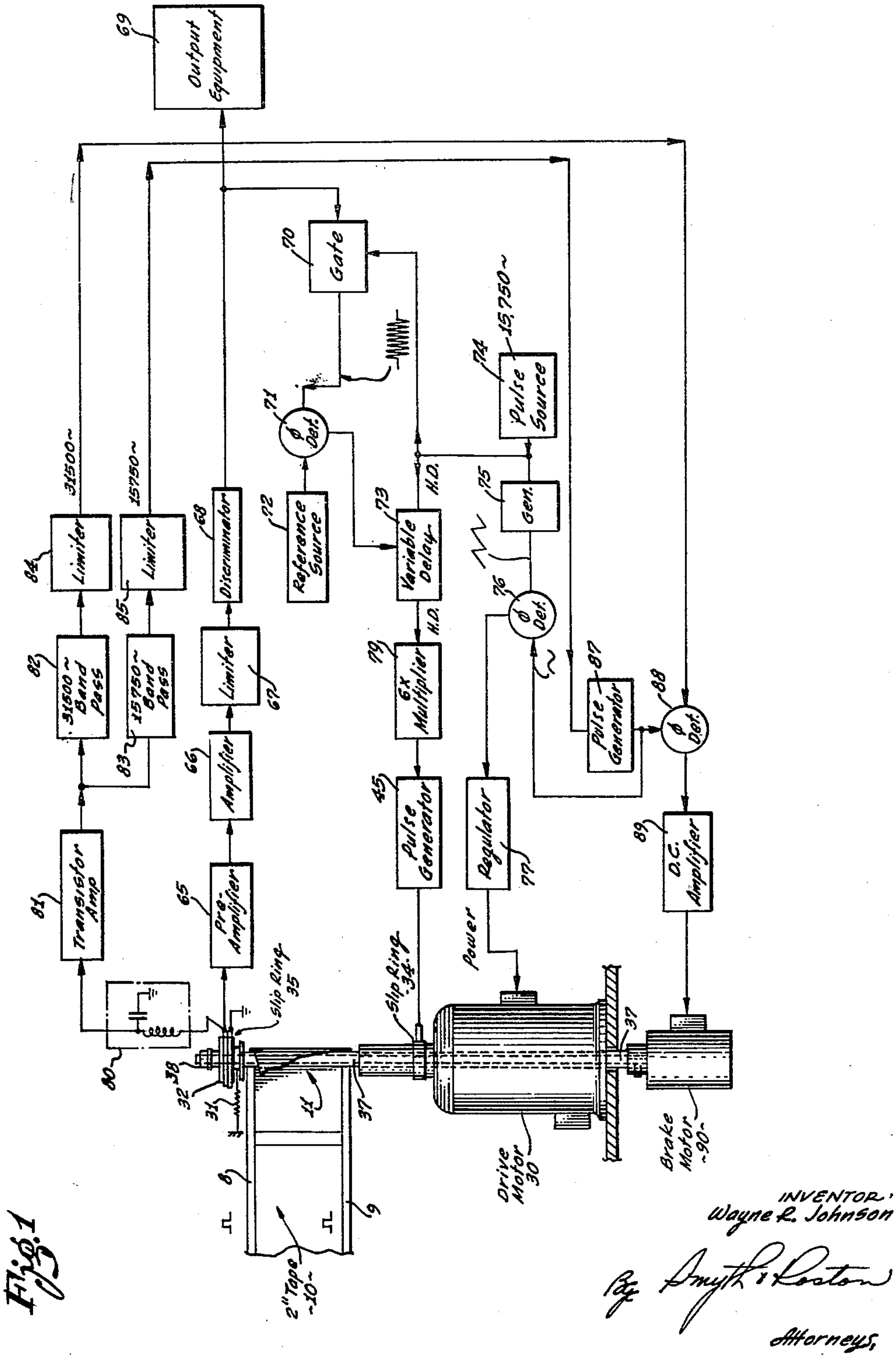
FIGURE 1 is a partial functional representation and partial top view of the transducer head and motors of the transducing system of this invention.

The transducing system of this invention, which is shown in FIGURE 1, can be utilized either for transversely recording or reproducing television signals or as editing apparatus for cyclically reproducing magnetically recorded television signals representing a single television frame.

Figures 2, 3:
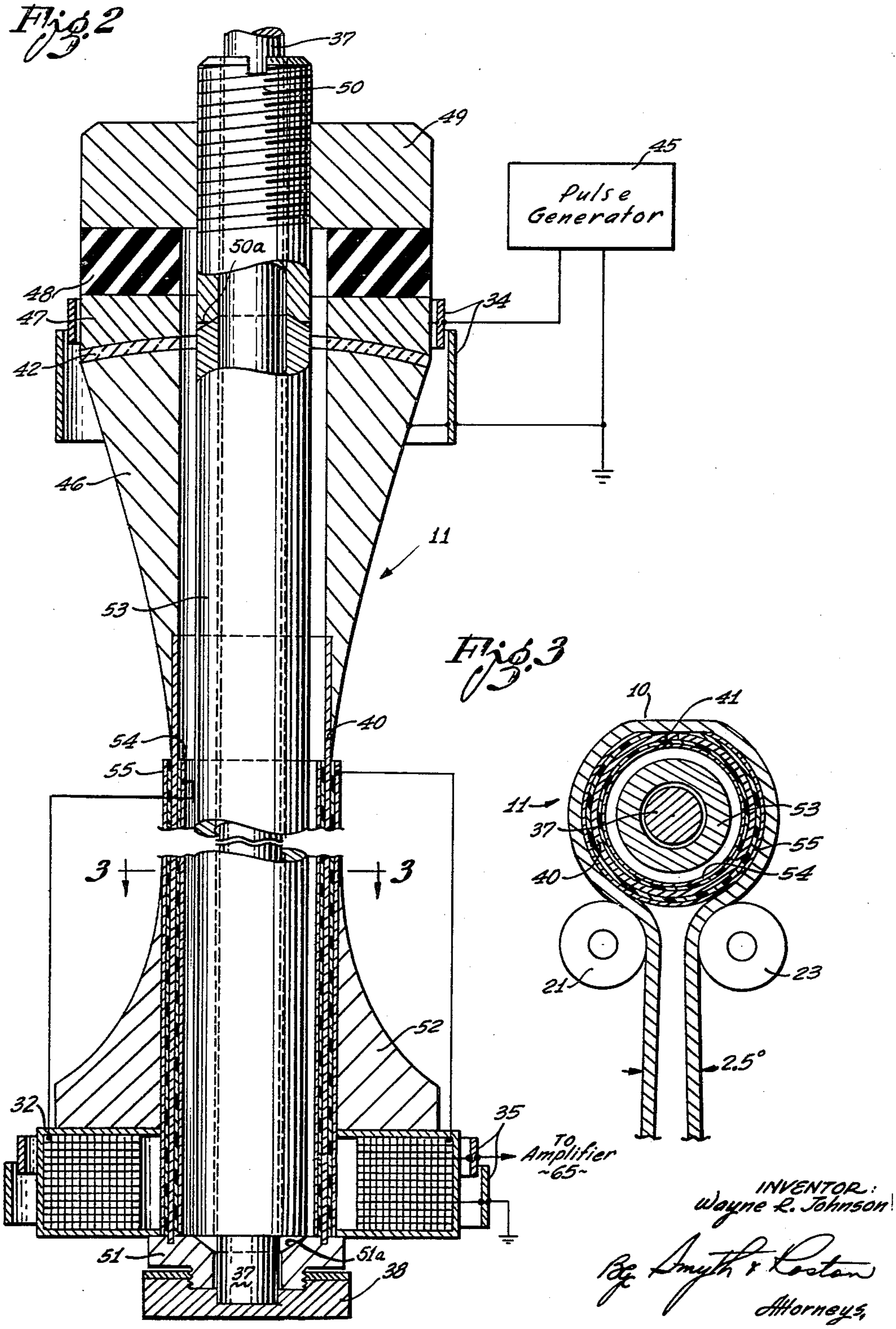
FIGURE 2 is a longitudinal sectional view of the rotating transducer head utilized in the transducing system of this invention.
FIGURE 3 is a sectional view of the rotating transducer head taken through lines 3—3 of FIGURE 2 and illustrating the position of the magnetic tape adjacent thereto.

The television signals are recorded on a magnetic tape 10 by utilizing a travelling wave transducer head 11 of the type briefly described herein in reference to FIGURES 2, 3, and 6, and described in detail in my co-pending patent application Serial No. 733,165, filed on May 5, 1958. As shown in FIGURES 2 and 3, the transducer head 11 includes a tube 40 of magnetostrictive material which changes its magnetic properties with stress. The magnetostrictive tube 40, which may be made of "Permalloy" tape, has a non-magnetic gap 41 extending longitudinally along the tube 40. Elastic waves are transmitted longitudinally through the magnetostrictive tube 40 by a piezoelectric crystal 42 responsive to voltage pulses developed by a pulse amplifier or generator 45 and coupled through a pair of slip rings 34 across the crystal 42. The pulses developed by the amplifier 45 are 0.1 microsecond in duration and have a repetition period which is slightly less than that required to transmit an elastic wave or acoustic pulse through the magnetostrictive tube 40.

At one end of the magnetostrictive tube 40, an acoustic transformer section 46 is mounted to couple acoustic waves generated by the piezoelectric crystal 42 to the magnetostrictive tube 40. The other side of the crystal 42 is attached to an annulus 47 which functions as a buttress against which the crystal 42 acts to deliver pulsed energy developed thereby to the acoustic transformer section 46. The annulus 47 is in turn backed by an annulus 48 of insulating material which is a good absorber of sound. The absorbent annulus 48 is in turn secured to a metal cap or nut 49 which is internally threaded to receive a hollow adjusting screw 50.

At the opposite end of the magnetostrictive tube 40, a cap 51, a toroidal coil 32, and an acoustic absorbent section 52 are mounted. The waves generated from the crystal 42 are transmitted or propagated through the acoustic transformer section 46 and the magnetostrictive tube 40 to the absorbing section 52. The structure including the magnetostrictive tube 40 is placed in tension by means of a hollow strut 53 extending longitudinally through the tube 40 and bearing at one end in a slight depression 50*a* formed in the inner end of the adjusting screw 50 and at the other end in a similar depression 51*a* in the cap 51.

The effect of the stresses applied to the magnetostrictive tube 40 due to the acoustic waves from the piezoelectric crystal 42 are illustrated in FIGURE 6. In FIGURE 6, the hysteresis loop 60 is that of the unstressed tube 40 and the slope of the loop represents its permeability. When the tube 40 is stressed longitudinally due to the effect of the nut 49 on the adjusting screw 50, the shape of the hysteresis loop is changed materially to that of the hysteresis loop 61. The hysteresis loop 61 is nearly rectangular in form having a very steep slope almost to the point of saturation. Circumferentially, however, the effect of the tension causes the slope of the hysteresis loop or the permeability of the tube 40 to approach zero as indicated by the loop 62. In other words, the magnetostrictive tube 40 acts as though it were non-magnetic to circumferential fields. Circumferential fields are induced by a signal winding including the plated sections 54 and 55 (FIGURES 2 and 3) which are plated on the exterior and interior respectively of the magnetostrictive tube 40.

A relaxation of the stress in the tube 40 causes the permeability to change back towards its normal condition as indicated by the curve 60. The acoustic waves or elastic pulses which are generated by the piezoelectric crystal 42 change the permeability or positions of the tube 40 along the wave due to the momentary relaxation of the stress. In this manner, the acoustic wave changes the condition of successive positions along the tube 40 from being effectively non-magnetic to being effectively magnetic. When the wave passes, the positions return to their normal effectively non-magnetic condition determined by the applied stresses.

During the time that an acoustic wave is transmitted longitudinally through the magnetostrictive tube 40, a signal current applied to the toroidal coil 32 is effectively recorded on a portion of the magnetic tape 10 which is positioned against the gap 41 in the tube 40. The toroidal coil 32 is electrically coupled to the two plated windings 54 and 55 on opposite sides of the magnetostrictive tube 40. Assuming that the head 11 is stationary and that the tape 10 is moved adjacent thereto, as the tape 10 is progressed along its longitudinal axis, the successive acoustic waves through the tube 40 cause the signals introduced to the windings 54 and 55 to be recorded as successive transverse tracks on the magnetic tape 10. As shown in FIGURE 3, the tape 10 moves along a substantially circular path adjacent the transducer head 11. Only approximately 7% of the circumference of the head 11 is not contacted by the tape 10.

Referring to FIGURE 5, the tape transport equipment for progressing the magnetic tape 10, adjacent to the transducer head 11 is shown in highly diagrammatic form. The magnetic tape 10 is driven from a pay-out reel 14 adjacent the transducer head 11 and rewound on a take-up reel 15.

From the pay-out reel 14, the magnetic tape 10 passes over a spring actuated tensioning arm 16 about which it turns at a substantially right angle to pass over a guide post 17. At the post 17, the magnetic tape 10 again makes a right angle turn to pass between a drive capstan 18 and a rubber nip-roller 19 and then against a cleaning device 20 to another guide post 26. The tape 10 makes a substantially 180 degree turn about the post 26 to the post 21 adjacent the transducer head 11. The post 21 and a post 23, which are also shown in FIGURE 3, direct the magnetic tape 10 around the transducer head 11 and then to the reel 15 along a path which is substantially the image of the path from the reel 14 to the head 11. Substantially the entire circumference of the head 11 is contacted by the tape 10, with as indicated above, only approximately 7% of the circumference of the head 11 not being contacted by the tape 10. The path from the transducer head 11 is over the post 23, around the post 27, between a nip-roller 24 and the drive capstan 18, around a post 28 and the spring actuated tensioned arm 29 to the take-up reel 15. The drive, therefore, for the magnetic tape 10 is a tight loop drive wherein the speed of the magnetic tape 10 is dependent primarily upon the peripheral speed of the drive capstan 18.

The signals which are recorded may be monochrome or color television signals or any other wide band signals which are frequency modulated on a carrier. Assume, for example, that the recorded signals are standard color television signals which are frequency modulated on a 10 megacycle carrier. The "NTSC" color television signal, which is standard in the United States, includes a signal representative of the luminance and brightness of the successive picture points regardless of their color and also includes side bands resulting from the modulation of two chrominance signals on two sub-carriers. The modulated sub-carriers which are of the same nominal frequency but in quadrature phase relationship are combined to produce a single train of color signals modulated in both phase and amplitude.

At the beginning of each of the horizontal scanning lines which trace the color television picture, a color synchronizing signal is supplied which includes a burst of the color sub-carrier frequency. The burst of color subcarrier frequency is utilized as a reference signal to establish the phase of an oscillator in the television receiver not shown. The signal from the oscillator in the receiver is resolved into orthogonal components which are employed in separate demodulators to recover the two chrominance signals. The hues reproduced at the receiver are dependent mainly upon the phase of the side band frequencies as compared with the phase of the periodic bursts of the reference frequency and the intensity of the hues is dependent mainly upon the amplitude of the side band frequencies. The repetition rate of the transverse tracks for recording the color television signals is at a nominal frequency of 94.5 kilocycles which is six times the horizontal line frequency of the television signals. Each horizontal line of the color television signals including the synchronizing pulse and the color burst is, therefore, recorded in six transverse tracks on the tape 10.

In addition to the color television signals which are recorded on the magnetic tape 10, two longitudinal control tracks 8 and 9 illustrated in FIGURE 1 are also recorded on the tape 10. As is hereinafter described, the control signals recorded on the two longitudinal tracks 8 and 9 are utilized during the reproducing sequence to automatically adjust the relative position between the transducer head 11 and the magnetic tape 10 to correct for any misalignment therebetween.

Figure 4:
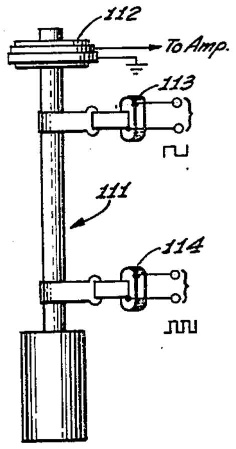
FIGURE 4 is a top view of a transducer head utilized to record the control signals along longitudinal tracks of the magnetic tape and to transversely record the television signals on the magnetic tape.

The control signals and the color television signals may be recorded on the magnetic tape by utilizing a composite transducer head 111 of the type shown in FIGURE 4 or the control signals may be separately recorded by apparatus not associated with a travelling wave transducer head 11. The transducer head 111 shown in FIGURE 4, which is briefly described herein to illustrate one means for recording the signals on the magnetic tape 10, is of the type described in detail in my co-pending patent application Ser. No. 733,045, filed on May 5, 1958.

As shown in FIGURE 4, the transducer head 111 includes a toroidal winding 112 for recording the video signals and two other windings 113 and 114 for recording the two control tracks 8 and 9 along the edges of a magnetic tape, not shown in FIGURE 4. The control signals introduced to the winding 113 are pulse signals having a repetition rate of 15,750 cycles per second whereas the signals to the winding 114 are pulse signals having a repetition rate of 31,500 cycles per second. The two windings 113 and 114 are only magnetically coupled to small portions of the tape along its edges whereas the toroidal coil 112 is coupled to plated windings, not shown, in a similar configuration as the winding 32 in FIGURE 2. The control pulses are synchronized with the pulses initiating the transverse recording of the television signals so that they occur respectively at each six and at each three transverse tracks. The control pulses are recorded along the transverse tracks at the edges of the tape 10 to form effectively two longitudinal tracks along the edges of the tape. The control pulses are not recorded along the edges of the tape between the transverse tracks.

To illustrate the dimensions of the control tracks and the transverse tracks, as recorded either by the transducer head 111 or by the head 11 and separate control signal recorders not shown, the magnetic tape may be 2 inches in width with 1.87 inches thereof being utilized for the television signals and the remaining 0.13 inch being utilized for the two control tracks with each actually occupying approximately a width of 0.06 inch allowing a small distance between them and the main 1.87 inch video recording width of the tape.

The transversely recorded television signals are in transverse tracks which may be recorded at displacements of 0.159 mil along the moving magnetic tape 10. The width of each of the transverse tracks may be approximately .1 mil, and the distance between adjacent tracks may be .059 mil so that the distance between center lines of adjacent tracks would be 0.159 mil. The duration for recording each transverse track is 10.55 microseconds with six tracks being utilized as indicated above for one horizontal line of the television signals having a duration of 63.5 microseconds. Each of the two interlaced fields of a television frame, which field includes 262½ lines, has a duration of 16,667 microseconds and the frame including two fields, therefore, has a duration of 33,334 microseconds. The distance along the longitudinal axis of the tape 10 utilized for one frame is 0.5 inch which is equal to 3,158 transverse tracks.

The color television signals may be reproduced by moving the recorded tape 10 adjacent the stationary head 11 and by halting the tape 10 and rotating the head 11. By halting the tape 10 and rotating the head 11, the tape 10 may be edited with signals representing one television frame being cyclically provided. FIGURE 1 illustrates the operation of the transducing system for cyclically providing the color television signals of one frame.

The transducer head 11 is rotated by a direct current motor 30 at a nominal speed of 1800 revolutions per minute. At a speed of 1800 revolutions per minute, each revolution has a duration of 33,334 microseconds which is also, as indicated above, the duration for recording one frame of the color television signals. In one revolution of the transducer head 11, therefore, the gap 41 (FIGURE 3) of the transducer head 11 rotates adjacent the stationary magnetic tape 10 at a speed equivalent to the recording speed of the tape 10. Substantially all the television signals corresponding to one frame of the recorded signals are reproduced during one revolution of the head 11 because the circumference of the head 11 is equal to 0.5 inch which is also the longitudinal dimension of the tape 10 utilized for recording one frame of the television signals. The maximum diameter of the transducer head 11 rotating adjacent the tape 10 is 0.159 inch which multiplied by 3.14 or $\pi$ is 0.5 inch.

The tape 10 need not be halted at any particular position relative to the recorded frames in order to cyclically provide signals representing a frame. For example, suppose that the tape 10 is halted at a position so that one complete field and portions of a second field preceding the complete field and a third field following the complete field are reproduced by the rotating head 11. As the head rotates, the successively provided signals would represent the bottom portion of a field, then the full field, then the top portion of the third field. The two partial fields are interlaced with the full field so that the reproduced signals represent one full frame. The reproduced signals also include, of course, the horizontal and vertical synchronizing pulses, and the color burst following the horizontal synchronizing pulses, all frequency modulated on the 10 megacycle carrier. The reproduced signals also include the two sets of control signals recorded along the edges of the tape 10.

As the transducer head 11 rotates adjacent the stationary magnetic tape 10, the signals recorded in the transverse tracks on the tape 10 are cyclically provided from the toroidal winding 32 through slip rings 35 to a low pass filter 80 and to a preamplifier 65. The preamplifier 65 couples the reproduced signals which, as indicated above, are color television signal frequency modulated on a 10 megacycle carrier, through an amplifier 66 to a limiter 67. The limiter 67 limits the amplitude of the frequency modulated signals and couples the limited signals to a discriminator 68. The discriminator 68 demodulates the frequency modulated signals and provides the color television signals to the output equipment 69. The output equipment 69 may be a conventional color television receiver or color television transmitting apparatus for transmitting the signals to another location. The control signals at the frequency of 15,750 cycles per second and 31,500 cycles per second are not passed through the amplifiers 65 and 66 which pass the frequency modulated relatively high frequency carrier of 10 megacycles.

If the equipment 69 is a television receiver, the successively provided images thereat, which are of the same television frame provide for a repeated image of the same frame. A single television frame as reproduced from a magnetic tape may, in this manner, be viewed and studied. The video signals which are supplied to the output equipment 69 are also coupled to a gate 70 which is periodically enabled under control of a pulse source 74. The pulse source 74 has a repetition rate of 15,750 cycles per second which, as indicated above, is the horizontal line frequency of the television signals. The pulses from the source 74 enable the gate 70 during the interval in which the 3.58 megacycle color bursts following the horizontal synchronizing pulse at the beginning of each horizontal line is received at the gate 70.

The phase of the color bursts through the gate 70 are compared with the phase of signals from a 3.58 megacycle reference source 72 by a phase detector 71. The phase detector 71 provides an error signal having a magnitude and polarity related to the detected variation in phase between the color bursts and the reference source signals. In other words, as the phase of the reproduced color bursts change, the magnitude and polarity of the error signal from the phase detector 71 changes accordingly. The error signal is provided from the detector 71 to a variable delay circuit 73 to which the pulses from the source 74 are also provided. The delay circuit 73 provides for a nominal delay of 10.55 microseconds which is the nominal interval between the elastic pulses in the transducer head 11 and between the transverse tracks.

The delayed pulses from the delay circuit 73 are provided to a multiplier circuit 79 which multiplies the repetition rate by a factor of six so that the pulses therefrom are at a nominal repetition rate of 94.5 kilocycles. These pulses are introduced to the pulse generator 45 which, as described above, initiates the successive elastic pulses or transverse waves in the transducer head 11. The adjustable delay provided for the elastic pulses under control of the phase variations of the color bursts compensates for any variations in speed of the transducer head 11 to insure that the elastic waves are initiated along the center lines of the transverse tracks on the tape 10.

The pulses from the source 74 are also introduced to a saw toothed wave generator 75 which provides the saw tooth waves at the frequency of 15,750 cycles per second to a phase detector 76. The phase detector 76 compares the phase of the 15,750 cycle control pulses which are recorded along the longitudinal control track 8 of the tape 10 with the phase of the saw tooth wave pulses from the generator 75.

As described above, the reproduced signals from the transducer head 11 are coupled to a low pass filter 80 which effectively attenuates the frequency modulated video signals. The low frequency components consisting of the two control signals are provided to a transistor amplifier 81 and then, in turn, to two band pass filters 82 and 83 which separate the two control signals. The band pass filter 82 passes the 31,500 cycles per second pulses and the band pass filter 83 passes the 15,750 cycles per second pulses. The separated pulses from the band pass filters 82 and 83 are coupled respectively through limiters 84 and 85 to a phase detector 88 and a pulse generator 87. The pulse generator 87 introduces the 15,750 cycle per second control pulses both to the phase detector 76 for comparison with the phase of the saw tooth wave pulses from the generator 75 and also to the phase detector 88 for comparison with the phase of the 31,500 cycle control pulses from the limiter 85.

The phase detector 76 recognizes any difference in phase between the control signals from the generator 87 and the waves delivered from the generator 75 and provides an error signal in accordance therewith to the motor regulator 77. The motor regulator 77 controls the speed of the drive motor 30 by adjusting the motor speed in accordance with the recognized changes in phase of the control signals from the tape 10. In this manner, as the phase of the developed control signals vary, the speed of the motor 30 is varied in a manner to compensate for the variation in the detected phase which represents a change in speed of the head 11. The speed of the motor 30 and of the head 11 is in this manner automatically regulated by utilizing the control signals recorded in the track 8 of the tape 10.

The phase detector 88 which compares the phase of the two different frequency control signals from tracks 8 and 9 provides an error signal in accordance with any recognized differences therebetween as an indication of any misalignment of the transducer head 11. Any misalignment between the transducer head 11 and the magnetic tape 10 due to an angular displacement of the head 11 during its rotation adjacent the tape 10 provides for a relative change in phase between the two sets of control signals. Actually, the transducer head 11 must be maintained at a slight angle to the longitudinal axis of the tape 10 in order for the transverse waves to pass along the imaginary center lines of the transverse tracks of the tape 10. The reason for the slight angle of the transverse tracks is that during the recording sequence of the transverse tracks, the tape 10 is moved adjacent the stationary head 11 so that the tracks are recorded at a slight angle which is dependent upon the speed of the tape 10 and the speed of the transverse waves in the head 11.

Phase displacement between the sets of control pulses from the two tracks 8 and 9 occurs when the angular position of the tape 10 with respect to the transducer head 11 is different during the recording and reproducing sequences. In other words, any skew during either the recording or the reproducing sequence will cause a phase displacement of the pulses reproduced from the two tracks 8 and 9.

The error signal developed by the phase detector 88 indicating the skew is provided to a direct current amplifier 89 which controls the speed of a brake motor 90. The motor 90 drives a shaft 37 which is concentric with the transducer head 11 passing through its hollow shaft 53 as shown in FIGURES 2 and 3. At the end of the shaft 53 adjacent the winding 32, the drive shaft 37 is connected by a fastener 38 to the transducer head 11. The fastener 38 is rigidly attached to the end of the shaft 37 and has internal threads which engage threads on the cap 51 (FIGURE 2). There is no other connection from the drive shaft 37 to any portion of the transducer head 11 or to the motor 39 through which it also passes. The brake motor 90 introduces a twisting torque in the transducer head 11 since the drive motor 30, which is coupled to one end of the head 11 is rotating it in one direction whereas the difference in speed between it and the brake motor 90 tends to restrict the rotation at the other end of the transducer head 11. The torque introduced in this manner by the brake motor 90 causes the transducer head 11 to tilt slightly to the right as shown in FIGURE 1, stretching or tensing a resilient spring 31. The greater the braking effect of the motor 90, or the greater the difference in instantaneous speed between the two motors 30 and 90, the greater is the angle of the head 11 relative to the tape 10. Actually, the two motors 30 and 90 rotate at substantially the same nominal speed with the motor 30 dragging the effectively lagging brake motor 90.

The error signal from the amplifier 89 changes the angular position of the head 11 to compensate for the detected phase displacement between the two control signals. In this manner, any skew developed by the angular variation of the position of the head 11 is automatically corrected.

To illustrate the skew-compensating effect by the angular movement of the rotating head 11, consider for example, that the head 11 is rotating in a clockwise direction when viewed from the top of FIGURE 1. Assume that the combined skew is such that the phase of the reproduced control pulses from the track 8 along the top edge of the tape 10 leads the phase of the reproduced control pulses from the track 9 along the bottom edge of the tape 10. This skew condition occurs during the reproducing sequence when the upper end of the head 11 is moving to the left so that track 8 is advancing with respect to track 9. The same phase displacement between the two sets of pulses may occur due to misalignment of the tape 10 during the recording sequence.

With the pulses from the track 8 being phase-advanced with respect to the pulses from track 9, the amplifier 89 decreases the magnitude of the error signal causing the motor 90 to reduce its speed or increase its braking effect. The increase of the braking effect increases the twisting torque in the transducer head 11 causing it to rotate sligthly in a clockwise direction about a pivot point at the motor 30. As shown in FIGURE 1, the end of the head 11 including the winding 32 moves slightly to the right against the spring 31.

In this manner, the control signals are utilized to compensate for any detected skew as well as to regulate the speed of the drive motor 30. In the transducing system, one additional automatic adjustment is made which, as described above, is of the repetition rate of the elastic pulses in the transducer head 11. All three adjustments are closely interrelated because a change in one may influence the other. For example, a variation in the speed of the motor 30 would automatically be compensated by the error signal derived from the detected change of phase of one of the sets of control signals. The change of speed of the rotating head 11 would also provide for a change of phase of the reproduced color bursts so that the repetition rate of the elastic pulses would also be automatically adjusted. The change of speed may also cause skew so that a phase displacement between the two sets of control signals may occur.

Although this application has been disclosed and illustrated with reference to particular applications, the principles involved are susceptible of numerous other applications which will be apparent to persons skilled in the art. For example, the dimensions of the various components are merely illustrative. The diameter of the transducer head 11 could be doubled and the speed of rotation halved so that the reproducing speed would be the same. Two frames would then be cyclically reproduced. If the speed of the tape during the recording sequence, however, is doubled, twice as much tape is required for a frame so the modified reproducing equipment would also be a single frame tester. Either of these embodiments are within the scope of this invention. The invention is, therefore, to be limited only as indicated by the scope of the appended claims.

I claim:

1. In a system for reproducing information recorded in a first direction in a particular number of transverse tracks on a medium movable in a second direction transverse to the tracks, transducer means positioned in the first direction relative to the medium for scanning successive positions in the first direction on each transverse track, means responsive to the scanning of the successive positions in the first direction on each transverse track for successively reproducing the information recorded in the first direction in each transverse track, and means operatively coupled to the transducer means for obtaining a rotation of the transducer means in the second direction relative to the medium to obtain a cyclical reproduction by the transducer means of the information recorded in the particular number of the transverse tracks on the medium in accordance with the rotary movement of the transducer means.

2. The system set forth in claim 1, including, means responsive to the reproduction of the information by the transducer means for obtaining an adjustment in the disposition of the transducer means relative to the tracks on the medium during the rotation of the transducer means to minimize skew of the medium relative to the transducer means.

3. Apparatus for testing a particular number of frames of television signals recorded in transverse tracks on a medium movable in a first direction transverse to the tracks wherein signals representing successive television frames are recorded on successive portions of the medium, including, transducing means disposed transversely relative to the medium and rotatable in the first direction relative to the medium to obtain the reproduction of the information from the transverse tracks in the particular number of frames on the medium in accordance with the enabling successive positions of the transducing means, scanning means operatively coupled to the transducing means to obtain periodic enablings of the transducing means in accordance with the rotary movement of the transducing means for the enabling of successive positions on the transducer means upon each such enabling of the transducer means by the scanning means, reproducing means operatively coupled to the transducing means to obtain the reproduction of information from the medium at a position on the medium corresponding to the position of enabling of the transducing means, and means for obtaining a rotation of the transducing means in the first direction relative to the medium.

4. The combination set forth in claim 3, including comparison means responsive to the signals reproduced by the reproducing means at different positions along the transducer means for comparing the characteristics of such signals to produce signals having characteristics representing the results of such comparison, and means responsive to the signals produced by the comparison means for adjusting the rotary movement of the transducer means relative to the medium in the first direction at different positions along the transducer means.

5. A system for testing a particular number of frames of television signals recorded in transverse tracks on a recording medium movable in a first direction transverse to the tracks, a rotatable transducer disposed transversely relative to the recording medium and rotatable in the first direction relative to the medium and having a substantially cylindrical body with a circumference substantially equal in length to a length of the recording medium required for recording the particular number of picture frames of the television signals, means operatively coupled to the transducer to obtain a reproduction of the television signals at successive positions along the transverse tracks, and means coupled to said transducer for rotating said transducer at a particular speed dependent upon the length and spacing of the transverse tracks on the medium to obtain a cyclical reproduction of the signals recorded on the portion of the recording medium having the particular number of frames being tested.

6. Apparatus for editing television signals recorded as a particular number of frames in transverse tracks on a recording medium movable in a first direction, a rotatable transducer disposed transversely relative to the medium and having a body rotatable through a circumferential distance substantially equal to the length of a particular portion of the recording medium required for recording the particular number of picture frames of the television signals, means for positioning the particular portion of the recording medium to abut said transducer along substantially the full rotary path of said transducer, means coupled to said transducer for successively enabling said transducer to successively initiate the reproduction by the transducer of transversely recorded tracks on the recording medium, and means coupled to said transducer for rotating said transducer at a particular speed so that said transducer is enabled by said initiating means at successive transverse tracks on said particular portion of the recording medium to obtain the cyclical reproduction of the signals recorded on said portion of the medium abutting said transducer.

7. Apparatus for testing a particular number of frames of television signals recorded in transverse tracks on a medium wherein the particular number of frames is recorded on a particular portion of the medium and wherein the medium is movable in a first direction transverse to the tracks, including transducer means disposed transversely relative to the medium and movable in the first direction relative to the particular portion of said magnetic recording medium to obtain the reproduction of the information in the transverse lines on the recording medium, means operatively coupled to the transducing means for obtaining a reproduction of information from the medium at successive positions in the transverse direction in each transverse track on the medium, means coupled to said transducer means for moving said transducer means in the first direction relative to said magnetic recording medium to obtain the cyclical reproduction of the television signals recorded in said particular portion of said recording medium, means responsive to the signals reproduced by the transducer means for recognizing any angular variation in the instantaneous transverse position of said transducer member with respect to the transverse lines of signals on said recording medium, and means coupled to said recognizing means for adjusting the transverse disposition of said transducer member in accordance with the recognized angular variations of the transverse position of said transducer member with respect to said transverse lines on said recording medium.

8. In a system for reproducing information recorded in transverse tracks on a particular portion of a recording medium movable in a first direction transverse to the tracks, transducer means transversely disposed relative to the recording medium and rotatable in the first direction relative to the recording medium for reproducing the information on the recording medium, means operatively coupled to said transducer means for obtaining a reproduction by said transducer means of information at successive positions in each transverse track on the medium, means connected to said transducer means for obtaining a rotation of said member in the first direction relative to the particular portion of the recording medium to provide a cyclical reproduction of the information recorded in said portion of the recording medium, means responsive to the signals reproduced by said transducer means for detecting any changes in the position of said transducer means relative to the transverse tracks in the recording medium, and means coupled to said detecting means and to said transducer means for adjusting the rotary movements of said transducer means with respect to the recording medium to compensate for the detected changes in the position of the transducer means relative to the transverse tracks in the recording medium.

9. A system for reproducing information recorded in a particular number of transverse tracks on a recording medium movable in a first direction transverse to the tracks, including, means including a hollow transducer head disposed transversely relative to the recording medium and rotatable in the first direction relative to the medium for cyclically and sequentially reproducing the information recorded in the particular number of transverse tracks on the recording medium, means operatively coupled to the transducer head for obtaining a reproduction by the transducer head of the information at successive positions in each transverse track on the medium, means coupled to one end of said transducer head for rotating said transducer head at a particular speed, means responsive to the disposition of the opposite ends of the head relative to the medium for producing signals having characteristics representing deviations in the disposition of the head relative to the transverse tracks on the recording medium, and means inserted through said hollow transducer head and attached to the other end of said transducer head and responsive to the signals produced by the last mentioned means for applying a twisting torque to the other end of said head for adjusting the axis of rotation of said head relative to the recording medium in accordance with the characteristics of such signals.

10. A system for reproducing information recorded in a particular number of transverse tracks on a recording medium movable in a first direction transverse to the tracks, including, transducer means disposed transversely relative to the medium and rotatable in the first direction relative to the medium for cyclically and sequentially reproducing the information recorded in the particular number of transverse tracks on the recording medium, means operatively coupled to the transducer to obtain a reproduction of the information at successive positions along the transverse tracks, means coupled to one end of said transducer means for rotating said transducer means at a particular speed in the first direction, means coupled to said transducer means and responsive to the signals reproduced by the transducer means for recognizing any misalignment between said transducer means and the tracks on the recording medium, and means attached to the other end of said transducer means for applying a twisting torque to the other end of said transducer means in accordance with the recognized misalignment by said recognizing means whereby the axis of rotation of said transducer means is shifted to correct the misalignment.

11. In a transducing system for reproducing information recorded in a particular number of transverse tracks on a recording medium movable in a first direction transverse to the tracks, a hollow transducer disposed transversely relative to the recording medium and movable in the first direction relative to the medium for reproducing the signals recorded in the transverse tracks on the medium, means operatively coupled to the transducer for obtaining a reproduction of the information at successive positions on each transverse track, means for obtaining a movement of the transducer relative to the medium in the first direction, means responsive to the signals reproduced by the transducing means for recognizing any misalignment between the transverse tracks on the recording medium and said hollow transducer means, and means coupled to said recognizing means and inserted in said hollow transducer means and attached to one end of said hollow transducer means for adjusting the movements of that end of said transducer relative to the other end of said transducer means in accordance with the recognized misalignment.

12. A system for reproducing information recorded in a first direction in a particular number of successive transverse tracks on a recording medium movable in a second direction transverse to the first direction, transducer means disposed in the first direction relative to the medium for reproducing the information recorded at successive positions in each transverse track on the recording medium, motor means coupled to said transducer means for providing an adjustable rotation of said transducer means in the second direction to obtain a sequential reproduction of the information in the particular number of transverse tracks, means coupled to said transducer means for producing a first signal having characteristics representing variations in the rotary speed of said transducer means, means responsive to said first signal for obtaining adjustments in the rotary speed of said motor means in accordance with the characteristics of said first signal, means coupled to said transducer means for producing second signals having characteristics representing any misalignment between said transducer means and the transverse tracks of said recording medium, and means coupled to said last mentioned means for adjusting the position of said transducer means relative to the transverse tracks of the recording medium in accordance with the detected misalignment to obtain an alignment between the transducer means and the transverse tracks of the recording medium.

13. In a system for reproducing information recorded in a particular number of transverse tracks on a recording medium movable in a first direction transverse to the tracks, transducer means disposed transversely relative to the recording medium and movable cyclically in the first direction relative to the recording medium for reproducing the information recorded in the particular number of the successive transverse tracks on the recording medium, means operatively coupled to the transducer means to obtain a reproduction of the information at successive positions along the transverse tracks, and means coupled to said transducer means and to the recording medium for establishing cyclic motion of said transducer means in the first direction relative to the recording medium to obtain the cyclical reproduction of the information recorded in the particular number of transverse tracks on the recording medium.

14. In a system for reproducing information recorded in a particular number of transverse tracks on a recording medium movable in a first direction transverse to the tracks, transducer means disposed transversely relative to the recording medium and rotatable in the first direction relative to the medium for reproducing the information recorded on the recording medium, said transducer means including enabling means for transmitting an enabling pulse along the transducer means for enabling the transducer means at the position of the pulse to reproduce the information at the corresponding position on the medium, means for rotating said transducer means in the first direction at a particular speed relative to the medium to obtain the reproduction of the transducer means of the information from the recording medium, means coupled to said transducer means for monitoring the reproduced signals to detect any variation in the rotary speed of said transducer means, and means coupled to said detecting means for adjusting said enabling means to vary the repetition rate of the enabling pulses through said transducer means in accordance with the detected variation in the rotating speed of said transducer means.

15. Apparatus for editing television signals recorded in a particular number of successive transverse tracks on a magnetic recording medium movable in a first direction transverse to the medium, a tranducer disposed transversely relative to the recording medium and rotatable in the first direction relative to the medium and having a substantially cylindrical body with a circumference substantially equal to a particular portion of the recording medium required for recording the particular number of successive transverse tracks of television signals, means for positioning the portion of the recording medium having the particular number of successive transverse tracks to contact subtsantially the full circumference of said cylindrical body of said transducer, means coupled to said transducer for sequentially initiating waves in said transducer to sequentially initiate the reproduction of the information on the transversely recorded tracks on the recording medium, means coupled to said transducer for rotating said transducer at a particular speed so that said waves are initiated by said initiating means at successive transverse tracks on said particular portion of the recording medium to obtain the cyclical reproduction of the signals recorded on said particular portion of the medium positioned against said transducer, means coupled to said transducer for monitoring the reproduced signals to regulate the rotary speed of said transducer head, and means coupled to said transducer for monitoring the reproduced signals to regulate the repetition rate of the waves in said transducer head with respect to the transverse tracks on the recording medium.

16. Apparatus for testing a particular number of frames of television signals recorded in transverse tracks along a recording medium movable in a first direction transverse to the tracks, including, a transducer disposed transversely relative to the recording medium and rotatable in the first direction and having a substantially cylindrical body with a circumference substantially equal to a particular portion of the recording medium required for recording the particular number of picture frames of the television signals, means for positioning the particular portion of the recording medium to abut substantially the full circumference of said cylindrical body of said transducer, means operatively coupled to the transducer to obtain a reproduction by the transducer of the information at successive positions in each transverse track on the medium, motor means coupled to said transducer for rotating said transducer at a particular speed to obtain the reproduction of the signals recorded on the particular portion of the recording medium, and means coupled to said transducer for monitoring the reproduced signals and for adjusting the operation of said motor means to vary the rotary speed of said transducer in accordance with the monitored signals for a synchronization in the movement of said transducer means with the presentation of the successive tracks on the recording medium.

17. In a system for reproducing information recorded in a particular number of transverse tracks on a recording medium movable in a first direction transverse to the tracks, transducer means disposed transversely relative to the recording medium and rotatable in the first direction relative to the medium for reproducing the information recorded on the recording medium, the transducer means including enabling means for introducing enabling signals to the transducer means to enable the transducer means at successive positions along the transducer means for the reproduction of the information at positions on the medium corresponding to the enabled positions on the transducer means, means for rotating the transducer means in the first direction relative to the medium to obtain the reproduction by the transducer means of the information from the recording medium, means coupled to the transducer means for monitoring the reproduced signals to detect any variation in the rotary speed of the transducer means relative to the disposition of the transverse tracks on the recording medium, and means coupled to the detecting means for varying the rotary speed of the transducing means in accordance with detected variations in the rotary speed of the transducer means relative to the disposition of the transverse tracks on the recording medium to obtain a synchronization between the rotary speed of the transducer means and the presentation of the transverse tracks on the recording medium.

18. In a system for reproducing information recorded in a particular number of transverse tracks on a recording medium movable in a first direction transverse to the tracks where the information includes color signals having information defined by a burst of reference signals at a particular frequency, including, transducer means disposed transversely relative to the medium and movable in the first direction relative to the medium for reproducing the information on the transverse tracks on the medium, means operatively coupled to the transducer means for obtaining the reproduction by the transducer means of the information at the successive positions in each transverse track on the medium, means for obtaining a movement of the transducer means in the first direction relative to the recording medium, means responsive to the information reproduced by the transducer means for obtaining a separation of the reference signals from the signals representing the color information, and means responsive to the information reproduced by the transducer means from the recording medium and including the reference signal for varying the operation of the motor means to synchronize the movements of the transducer means with the information on the transverse tracks to the transducer means.

19. The combination set forth in claim 18, including, means responsive to the signals reproduced by the transducer means for adjusting the rotary movement of one end of the transducer means relative to the other end of the transducer means to obtain a further synchronization between the movement of the transducer means and the disposition of the transverse tracks on the recording medium.

References Cited in the file of this patent

UNITED STATES PATENTS

| | | |
|---|---|---|
| 2,528,699 | Masterson | Nov. 7, 1950 |
| 2,683,856 | Kornei | July 23, 1954 |
| 2,751,439 | Burton | June 19, 1956 |
| 2,780,774 | Epstein | Feb. 5, 1957 |
| 2,854,526 | Morgan | Sept. 30, 1958 |
| 2,860,179 | Blackstone | Nov. 11, 1958 |
| 2,876,295 | Irby | Mar. 3, 1959 |
| 2,890,275 | Lesti | June 9, 1959 |
| 2,912,493 | Crooks et al. | Nov. 10, 1959 |
| 2,919,314 | Holt | Dec. 29, 1959 |
| 2,921,989 | Serrell | Jan. 19, 1960 |